United States Patent [19]

Murphy et al.

[11] Patent Number: 4,844,144

[45] Date of Patent: Jul. 4, 1989

[54] INVESTMENT CASTING UTILIZING PATTERNS PRODUCED BY STEREOLITHOGRAPHY

[75] Inventors: Edward J. Murphy, Des Plaines; Robert E. Ansel, Hoffman Estates; John J. Krajewski, Wheeling, all of Ill.

[73] Assignee: DeSoto, Inc., Des Plaines, Ill.

[21] Appl. No.: 229,476

[22] Filed: Aug. 8, 1988

[51] Int. Cl.$^4$ .................................................. B22C 9/02
[52] U.S. Cl. ........................................ 164/35; 164/45; 164/246; 249/62
[58] Field of Search ...................... 164/34, 35, 36, 45, 164/246, 249; 249/61, 62

[56] References Cited

U.S. PATENT DOCUMENTS

| | | | |
|---|---|---|---|
| 4,078,035 | 3/1978 | Ugata et al. | 164/34 |
| 4,356,859 | 11/1982 | Savage | 164/35 |
| 4,575,330 | 3/1986 | Hull | 425/162 |
| 4,603,726 | 8/1986 | Pfannenstiel et al. | 164/35 |

*Primary Examiner*—Richard K. Seidel
*Attorney, Agent, or Firm*—Dressler, Goldsmith, Shore, Sutker & Milnamow, Ltd.

[57] ABSTRACT

A method of investment casting utilizes a pattern produced by stereolithography in which a three-dimensional specimen is provided by light cure of ethylenically unsaturated liquid material. The stereolithography composition is constituted by the ethylenically unsaturated liquid material in admixture with an inert low thermoplastic material which weakens the pattern when heated within the mold used in the investment casting process to prevent the thermal expansion of the pattern from cracking the mold.

18 Claims, No Drawings

INVESTMENT CASTING UTILIZING PATTERNS PRODUCED BY STEREOLITHOGRAPHY

DESCRIPTION

1. Technical Field

This invention relates to a method of investment casting utilizing stereolithography to produce a three-dimensional specimen by ultraviolet or visible light exposure of an ethylenically unsaturated liquid bath. In this invention the specimen loses structural rigidity at elevated temperatures to enable its use in an investment casting.

2. Background of the Invention

Investment casting is an industrial process which employs a disposable pattern (specimen) that is used to produce a mold in which parts can be cast. The pattern is conventionally made by injecting wax or plastic into a pattern die which has been manufactured by machining processes.

The pattern produced in the pattern die (which corresponds to the three-dimensional specimen used herein) is melted or burned out of the mold in which parts are later cast. Since the pattern possesses the shape of the required finished part, the parts which are later cast have the required shape.

The mold is built up around the pattern by a well known process the details of which differ depending upon the type of metal to be cast in the mold. In general, and using the casting of ferrous alloys to illustrate the investment casting process, the pattern is coated with, i.e., invested in, a refractory slurry, for example an aqueous ceramic slurry, which is drained of excess water to form a coating, and the coating is then stuccoed with fine ceramic sand. This step is usually repeated several times (10 to 20 layers are not uncommon) after the first coating is dry. The invested pattern is then placed in an open ended metal container which is filled with a coarse slurry of ceramic back-up material which hardens. The pattern which is invested in the ceramic is then placed into a furnace or autoclave causing the wax or plastic pattern to be melted or burned out of the resulting mold.

Removal of the pattern leaves a cavity in the mold corresponding in shape and dimension to the final part, although the pattern (and therefore the cavity) can be slightly larger to compensate for shrinkage or machining of the part which is produced by the subsequent casting operation.

The mold is sometimes fired to burn out the last traces of pattern material before the cavity is filled with molten metal. This firing process proceeds slowly in a controlled cycle which can be in a time range of 12 to 18 hours to fuse the ceramic and avoid cracking the mold.

Following firing, molten metal is introduced into the mold cavity and solidified by cooling. After solidification, the ceramic mold is broken away to release the finished part.

The process described above is relatively expensive in terms of the tooling which is required to make the dies used in forming the pattern. Consequently, the prior art process is impractical for use when only a few parts are desired.

Even when a larger number of parts is desired, the prior process is expensive because it may be necessary to prepare several sets of pattern dies having varying dimensions. This is because the amount of oversize of the pattern (and thus of the die) which is necessary to allow for shrinkage of the pattern or cast part must be determined empirically by producing a number of the patterns until the proper size is determined to achieve the desired final part dimensions. The problem of shrinkage is particularly severe in connection with casting materials such as powdered metal where shrinkage may amount to 35 percent or more. Elimination of pattern dies would be beneficial for economic and production reasons.

It is known, as illustrated in U.S. Pat. No. 4,575,330 to C. W. Hull, to form threedimensional objects of complex shape using computer guided ultraviolet light, such as that from a laser beam, to solidify superposed layers of a liquid ultraviolet-curable ethylenically unsaturated material, preferably (meth)acrylate based material, at the surface of a liquid reservoir of such material. Dimensionally accurate objects, which are usually thin-walled, are formed in this manner. This process has come to be known as "stereolithography" and it provides an inexpensive way to form models of desired shape.

In present practice, the light used may be in the ultraviolet range which extends from about 200 nanometers to about 400 nanometers. However, the ethylenically unsaturated compositions may be made to solidify on exposure to light somewhat above the ultraviolet range, e.g., up to about 600 nanometers, preferably up to about 520 nanometers. The point of interest is that the wavelength of the light used for polymerization is not the prime consideration herein, and lasers of longer wavelength are more durable.

Attempts to utilize these stereolithographically formed objects as patterns for investment casting have been unsuccessful heretofore. This is because the so-formed pattern (specimen) is a cross-linked polymeric matrix constituted by radiation-cured ethylenically unsaturated material. Such material, when fully cured, is rigid and expands when heated causing the mold to crack before the pattern can be heated sufficiently to cause it to be burned out. Melting is not applicable to these specimens because they are constituted by cross-linked polymeric materials which do not melt.

The combination of stereolithography with investment casting would provide a powerful production system because it would allow the rapid and inexpensive production of accurate specimens to be used in the investment casting process. To accomplish this, the present invention has overcome the aforementioned shortcomings of both conventional investment casting and stereolithography. More particularly, the expense of forming the patterns is reduced by forming them using stereolithography, and the specimens formed by stereolithography are rendered useful as patterns in investment casting.

SUMMARY OF THE INVENTION

In accordance with this invention, a method of investment casting is provided which utilizes a stereolithographically formed pattern which is unusual because it loses structural rigidity at elevated temperatures. In this method, an ethylenically unsaturated radiation-curable liquid composition is used which has incorporated therein an easily heat-softenable thermoplastic material, preferably an oligomer of low molecular weight which is inert with respect to the unsaturated material. This modified liquid composition cures to form a cross-linked polymeric matrix having interstices which are filled with the thermoplastic oligomer, and this oligomer functions to prevent the mold cracking previously encountered.

Whenever any physical characteristic is specified herein, e.g., the liquid state, ambient conditions (25° C.) is intended unless otherwise stated.

More particularly, in the investment casting method of this invention, a mold is formed by applying a mold material, e.g., an aqueous refractory slurry, to a three-dimensional pattern to invest the pattern in the mold material. The mold material is then dried to harden it and the pattern is burned out of the mold by heating to a sufficiently elevated temperature which also serves to fuse the mold material to complete the formation of the mold.

In this invention the pattern is constituted by a cross-linked polymeric matrix provided by radiation-cured ethylenically unsaturated material having dispersed therein a thermoplastic oligomer. This thermoplastic oligomer is inert with respect to the unsaturated material and has a softening point sufficiently low to avoid cracking the mold on subsequent heating. When the mold is heated after it has hardened, the pattern weakens to avoid cracking the mold, and on further heating the pattern decomposes and is burned out of the mold. More particularly, the oligomer flows when heated to weaken the pattern and prevent its thermal expansion from cracking the mold. In preferred practice the oligomer has a melting point below about 100° C., and can be liquid at room temperature. Waxy solids are presently viewed as best, such as a caprolactone polyol having a melting of about 32° C. which will be illustrated hereinafter.

As will be evident, the presence of the oligomer in the stereolithographically-formed specimen which is used as the pattern is crucial to the combinability of stereolithography and investment casting. The stereolithography technique used is conventional, and is illustrated in U.S. Pat. No. 4,575,330 to Hull, discussed hereinabove.

DETAILED DISCLOSURE OF THE INVENTION

As previously noted, the present invention contemplates a method of investment casting utilizing a radiation-curable liquid composition adapted to cure, preferably rapidly, to a cross-linked three dimensional shaped polymeric specimen suitable as an investment casting pattern. The radiation-curable composition constituting the liquid bath used in the stereolithographic process includes, per this invention, a radiation-curable ethylenically unsaturated liquid having dispersed therein, and preferably dissolved therein, a thermoplastic material which melts below the previously noted temperature, preferably an oligomer which melts in the range of 10° C. to 40° C., so that the cured polymeric matrix is weakened when heated.

A cross-linked polymeric matrix is formed by the cure of the liquid ethylenically unsaturated material which is preferably solvent-free or substantially so (less than 5% solvent). That cure is initiated by a brief exposure to light of appropriate length to produce a solidifed partially cured specimen within the unsaturated liquid bath. The cure of this specimen may be completed by a further exposure to light after the specimen has been removed from the bath in which it was formed. Correspondingly, the specimen removed from the bath (which is already a cross-linked polymeric matrix) may be cured by heat, and a free-radical polymerization catalyst can be introduced into the specimen to assist the thermal cure, as by making it more rapid and effective at lower temperature. Regardless of how the cure is completed, the cured material is of the character specified and the thermoplastic oligomer is dispersed within the interstices of that matrix.

Except for the thermoplastic oligomer, the ethylenically unsaturated composition used in the stereolithographic process may vary considerably, including those which are known for this purpose. It is only necessary that the composition be a free-flowing liquid and radiation-curable. It is preferred that the ethylenically unsaturated constituent not include reactive groups other than the ethylenic unsaturation to insure avoidance of reaction with the thermoplastic oligomer which may contain some reactive groups, such as hydroxy groups or carboxy groups. Reactive groups other than the ethylenic unsaturation can be tolerated only if these groups do not react with the oligomer.

The thermoplastic oligomer is substantially inert in the sense that it must be non-reactive with the other components of the composition. It therefore cannot contain any reactive ethylenic functionality, e.g., an acrylate group. The thermoplastic oligomer also should not effect the radiation cure of the composition from the liquid to the solid state. Thus, amine groups which may have this effect and thus cause the oligomer to chemically bond with the polymeric matrix which is formed, should be substantially excluded. In preferred practice the thermoplastic oligomer is soluble in the liquid radiation-curable composition, for this provides the most uniform dispersion of the oligomer in the cross-linked polymeric matrix which is produced.

Thermoplastic oligomers suitable for use in the present application must flow (flow may result from depolymerization as well as softening) at a temperature less than the temperature at which the matrix expands to the point where it cracks. These thermoplastic oligomers can be a liquid at ambient temperature, i.e., about 25° C. However, patterns (specimens) formed by the present composition are solid at about ambient temperature, the liquid oligomer being held within the cross-linked polymeric matrix which is formed.

The thermoplastic oligomer desirably has a number average molecular weight in the range of about 200 to about 5000, preferably 250 to 1000, and preferably is a liquid or waxy solid at room temperature which is soluble in the ethylenically unsaturated liquid. Most preferably the oligomer has a melting point of from 10° C. to 40° C. since this allows adequate weakening of the polymeric matrix on heating while retaining maximum strength (as measured by tensile modulus) at room temperature.

It is important that the oligomer does not add significantly to the viscosity of the overall composition. The viscosity of the overall composition preferably is less than about 10,000 centipoise (cp) and more preferably in the range of about 500 to about 2000 cp. Low viscosity helps one to form thin layers in the stereolithographic process, and it also helps to drain away excess liquid when the formed specimen is removed from the unsaturated liquid in which it was formed.

The term "depolymerize", as used herein in its various grammatical forms, means a reduction in molecular weight. Such reduction can cause the oligomer to flow by making the oligomer softer, or by lowering its melting point, or even by vaporizing a portion of it. The point is to weaken the polymeric matrix so that it yields instead of cracking the hardened mold which surround the pattern constituted by that polymeric matrix.

In the method of the present invention, a photoinitiator effective to initiate the cure of the ethylenic functionality upon exposure to light of appropriate wavelength is normally present. The photoinitiator is preferably added shortly before the composition is placed in the stereolithographic bath in order to maximize stability, but the bath can be maintained in the dark to extend its period of usefulness. The exposure is then carried out, layer by layer, as taught in the Hull patent, until the specimen used as a pattern herein is formed. This specimen is then drained of excess liquid and cured to strengthen it.

The cured specimen constituting the pattern is then invested, that is surrounded, by a conventional investment mold material, e.g., a refractory slurry, which hardens as its dries. Modest heat can be used to speed the hardening process, and hardening of the mold material can be combined with the application of heat used to burn out the pattern.

The pattern and the hardened mold material which surrounds it are heated to removed the pattern from the mold. The mold is formed with an opening to permit the vapor formed by the vaporized pattern to exit the mold. As the temperature is increased, the thermoplastic oligomer flows out of the polymeric matrix, to weaken that matrix. Of course, only partial flow sufficient to relieve the pressure of thermal expansion is intended, and in this way the matrix is weakened sufficiently to limit the expansion force and thus avoid cracking the mold.

The mold material is fused and the pattern is vaporized upon continued exposure to elevated temperature. The result is a completed mold substantially ready for use in a metal casting process. It will be understood that the mold is destroyed in the metal casting process, so one stereolithographic specimen produces a single mold and a single casting. This is quite satisfactory for production runs which are relatively small, e.g., up to a few hundred castings. While metal castings are primarily contemplated, any liquid material which solidifies may be cast in this manner, e.g., plastic or ceramic compositions.

Illustrative oligomeric thermoplastic resins suitable for use in the present composition include natural waxes, e.g., animal waxes (beeswax), vegetable waxes (carnauba), mineral waxes (ozecerite, paraffin, and microcrystalline petrolatum), synthetic waxes (ethylenic polymers, ethylenic polyol ether-esters, and chlorinated naphthalenes), plasticizers (phthalate, adipate and sebacate esters of alcohols containing from 4 to 22 carbon atoms and of polyols such as ethylene glycol, glycerol, and pentaerythritol) Low molecular weight polyesters formed by reacting a large excess of a diol with a polycarboxylic acid, such as adipic acid or trimellitic acid are also useful. Combinations of the foregoing are also useful.

The oligomer can have hydroxy groups present but these must be nonnreactive with the ethylenically unsaturated materials present in the stereolithogrpahic bath. This is normally the case, but when a reactive monomer is present, such as butoxymethyl acrylamide, then the oligomer should be free of hydroxy functionality.

Preferred thermoplastic oligomer are low molecular weight polyesters, e.g., epsilon caprolactone polyester polyols, which have a number average molecular weight in the range of about 200 to about 5000, preferably in the range of 250 to 1500. These are made by polyesterifying a polyol, such as ethylene glycol, propylene glycol or butylene glycol, with the lactone. Polyols with more than two hydroxy groups are also useful, such as trimethylol propane and pentaerythritol. Control of the proportion of lactone and the selection of the polyol allows one to provide a polyester having the desired number average molecular weight. As will appear in the examples, triols, such as trimethylol propane, are particularly useful in this process to provide preferred materials for use in this invention.

Two thermoplastic oligomers which are epsilon caprolactone polyesters of a polyhydric alcohol and which are quite useful herein are the commercial products Tone 0301 and Tone 0310. These are available from Union Carbide Corporation of Chicago, Ill. Tome 0301 is a polyester formed by esterifying ethylene glycol with the caprolactone to provide a number average molecular weight of about 300. This product is a liquid at room temperature. Tone 0310 is a polyester formed by esterifying trimethylol propane with the caprolactone to provide a number average molecular weight of about 900. This product is a waxy solid at room temperature, melting at about 32° C.

An exemplary ethylenically unsaturated radiation-polymerizable liquid composition which is suitable for use in stereolithography includes a resinous poly(meth)acrylate (containing more than one unpolymerized (meth)acrylate group) dissolved in an ethylenically unsaturated liquid which may be constituted by a liquid mono(meth)acrylate, a liquid poly(meth)acrylate, or a mixture of these liquids, and a photoinitiator. This composition can further include a liquid N-vinyl monomer, such as N-vinyl pyrrolidone, which is regarded to be embraced by the term (meth)acrylate because the photopolymerization is so similar.

The resinous poly(meth)acrylate suitable for use in the present composition is subject to considerable variation provided it is of a resinous nature and contains an average of at least 1.2, and preferably at least about 2.0 (meth)acrylate groups per molecule. These can be illustrated by epoxy diacrylates, e.g., Epon 1001 diacrylate and Epon 828 diacrylate, available from Shell Chemicals, New York, N.Y., a polyester diacrylate or a polyurethane diacrylate. Similar products containing more than two acrylate groups are also available and are useful herein. Epon 828 is a diglycidyl ether of bisphenol A having a number average molecular weight of 390, and Epon 1001 is of the same character, but having a higher molecular weight.

Polyurethane diacrylates are also quite useful as the resinous poly(meth)acrylate, especially those which employ a polyester base. Particularly preferred is an acrylate-capped polyurethane polyacrylate which is the urethane reaction product of an hydroxy-functional polyester, especially one having an average of from about 2.0 to about 5.0 hydroxy groups per molecule, with a monoacrylate monoisocyanate. These are illustrated by a polyester made by reacting trimethylol propane with caprolactone to a number average molecular weight of 600 followed by reaction with three molar proportions of the reaction product of 1 mole of 2-hydroxyethyl acrylate with 1 mole of isophorone diisocyanate. The end product is a polyurethane triacrylate, and the urethane-forming reaction is conventional, being typically carried out at 60° C. in the presence of 1% by weight of dibutyl tin dilaurate. A commercial polyester-based acrylated polyurethane which is useful herein is Uvithane 893 available for Thiokol Chemical Corp., Trenton, N.J. The polyester in the Uvithane 893 product is a polyester of adipic acid with about 1.2 molar proportions of ethylene glycol polyesterified to an acid number of less than 5. This polyester is converted as above described to an acrylated polyurethane which is a semi-solid at room temperature and which has an unsaturation equivalent of 0.15–0.175 ethylenically unsaturated groups per 100 grams of resin.

The resinous poly(meth)acrylate is dissolved in a reactive solvent which preferably includes a liquid poly(meth)acrylate. While liquid tri(meth)acrylates are preferred, di(meth)acrylates, e.g., 1,6-hexanediol di(meth)acrylate, are also suitable. Liquid tetra(meth)acrylates, e.g., pentaerythritol tetraacrylate, are also useful. A preferred liquid poly(meth)acrylate is trimethylol propane triacrylate.

Also optionally present as a reactive solvent is an N-vinyl monomer. Illustrative N-vinyl monomers include N-vinyl pyrrolidone and N-vinyl caprolactam, with N-vinyl pyrrolidone being preferred.

Inert volatile solvents are substantially absent, and while a small amount may be present to adjust viscosity and wetting characteristics, such materials are preferably absent.

A photoinitiator effective upon exposure to light in or near the ultraviolet range to initiate polymerization of ethylenic unsaturation is present in the composition, albeit the liquid composition of the present invention can be supplied without the photoinitiator with the photoinitiator being added prior to cure. These photoinitiators are themselves well known and in common use. They are usually ketonic, and frequently aromatic, such as benzophenone. It is presently preferred to use a commercially available aryl ketone photoinitiator, e.g., Irgacure 184, which can be obtained from Ciba Geigy Corp. This product is constituted by the compound hydroxycyclohexyl phenyl ketone.

The thermoplastic oligomer is desirably present in an amount in the range of about 5 to about 50, preferably 15 to 35, weight percent based on the total weight of the composition.

The ethylenically unsaturated liquid constituent is present in an amount in the range of about 50 to about 95, preferably 65 to 85, weight percent based on the total weight of the composition.

Referring more particularly to the ethylenically unsaturated liquid which constitutes the conventional stereolithographic bath, the resinous poly(meth)acrylate is present in an amount in the range of about 15 to about 80, preferably 40 to 70, weight percent based on the total weight of the ethylenically unsaturated material.

The liquid ethylenically unsaturated material constitutes the balance of the mixture of ethylenically unsaturated material. These liquid materials are thus present in an amount in the range of about 20 to about 85, preferably 30 to 60, weight percent, based on the total weight of the ethylenically unsaturated material. This liquid is preferably a mixture of monoethylenically and polyethylenically unsaturated materials in a weight ratio of from 4:1 to 1:4. The optional N-vinyl monomer (considered to be a monoacrylate because of its rapid cure) is a preferred monoethylenic component used in an amount of from about 10 to about 40 percent of the composition.

The photoinitiator is present in an amount in a range of about 1 to about 10 weight percent based on the total weight of the ethylenically unsaturated material.

The following example illustrates the present invention, it being understood that all parts are by weight, unless otherwise stated, and all molecular weights are by number average.

EXAMPLE 1

A Composition of the Present Invention

An illustrative composition of the present invention was prepared by admixing the components of TABLE I, below, in a suitable vessel.

TABLE I

| Component | Parts by weight (grams) |
| --- | --- |
| Polyester urethane diacrylate oligomer[1] | 30 |
| Trimethylol propane triacrylate | 20 |
| N—vinyl pyrrolidone | 20 |
| Caprolactone polyester polyol[2] | 30 |
| Aryl ketone photoinitiator[3] | 4 |

Note [1]Uvithane 893, described previously.
Note [2]Tone 0301, described previously.
Note [3]Irgacure 184, described previously.

A liquid bath of this photopolymerizable liquid was exposed to ultraviolet light using a Liconix model 4240 N, helium-cadmium light having an output of 15 milliwatts at 325 nanometers focused to 350 micron diameter. The usual dosage is about 3.0 Joules per square centimeter of surface area which results in a polymerized layer about 20 mil thick. Subsequent layers were applied as previously described until the specimen was formed.

The specimen was removed from the bath and unreacted polymerizable liquid was allowed to drain back to the bath. This specimen was then exposed to ultraviolet light in a sealed chamber and the exposure was continued until the specimen cured to maximum structural rigidity. A cured specimen made as described and having a thickness of about 20 mils was the pattern used hereinbelow.

Patterns obtained from the above composition exhibited about 20 to about 25 weight percent extractables in methyl ethyl ketone (MEK). That is, when a pattern of known weight is placed in an MEK bath having a temperature of about 25° C., for a time period of 2 hours and then removed from the bath, dried and reweighted, the pattern experienced a weight loss in the range of about 20 to about 25 percent. In contrast, specimens obtained from a composition similar to that of TABLE I but without the thermoplastic oligomer (the caprolactone polyester polyol) exhibited less than 1 weight percent extractable under the same conditions. This demonstrates that the oligomer has not reacted to become a part of the cross-linked polymeric matrix constituting the cured specimen, so as to be able to act independently of that matrix.

Patterns obtained from the composition of TABLE I also exhibited significant softening and loss of structural rigidity and dimensional integrity at a temperature of about 250° C. In contrast, specimens obtained from a composition similar to that of TABLE I but without the thermoplastic oligomer (caprolactone polyester polyol) retained structural rigidity and dimensional integrity at this temperature.

Patterns obtained from the composition of TABLE I were invested in a refractory slurry. The slurry was dried for a time period sufficient to cause hardening. The pattern and slurry were then heated to a temperature sufficient to remove the pattern and fuse the slurry. A mold was thereby produced.

To further illustrate the present invention, a series of comparative experiments were carried out using illustrative compositions shown in TABLE II.

TABLE II

| Component | A | B | C |
|---|---|---|---|
| Epon 828 diacrylate (defined previously) | 30 | 30 | 30 |
| Tetrahydrofuran acrylate | 20 | 20 | 20 |
| Trimethylol propane ethoxy triacrylate[1] | 10 | 10 | 10 |
| Trimethylol propane ethoxy trimethacrylate[2] | 10 | 10 | 10 |
| Polyethylene glycol, mol. wt. 400 | | 30 | |
| Tone 0310 (defined previously) | | | 30 |
| Irgacure 184 (defined previously) | 4 | 4 | 4 |
| Viscosity (centipoises) | 600 | 520 | 620 |

Note [1]Ethoxylated trimethylol propane reacted with three molar proportions of acrylic acid and having a number average molecular weight of 428.
Note [2]Ethoxylated trimethylol propane reacted with three molar proportions of methacrylic acid and having a number average molecular weight of 475.

Liquid baths of these photopolymerizable liquids were exposed to ultraviolet light as previously described and then removed from the bath, excess liquid was drained therefrom, and specimens having a thickness of 20 mils were cured with ultraviolet light. All of the specimens were prepared and cured in the same way and this provided a full cure as evidence by a 2 hour extraction in methyl ethyl ketone at 25° C. providing less than 1% extraction for product A in TABLE II. Products B and C contain unreacted thermoplastic material and about 24% was extracted from each cured product in the stated extraction test, showing that most of the polyethylene glycol and Tone 0310 components were not chemically combined in the cured products.

The cured specimens were subjected to thermographic analysis in which the specimens were heated at a controlled rate (10° C./minute) and the weight loss experienced is graphed against the temperature. None of the specimens showed any weight loss at 100° C., and the weight loss of product A was 2% at 200° C., 5% at 300° C. and 26% at 400° C. This establishes that product A retained its weight until heated to a very high temperature. This is why it retains its structural integrity after extensive thermal expansion so as to crack a mold invested around it.

In contrast, product B lost 6% of its weight at 200° C., 21% of its weight at 300° C. and 56% of its weight at 400° C. This shows that specimen B loses its integrity before it reaches 300° C. to avoid expanding unduly before it yields. Product C lost 4% of its weight at 200° C., 13% of its weight at 300° C. and 56% of its weight at 400° C. This shows that specimen C loses its integrity before it reaches 300° C. to avoid expanding unduly before it yields, albeit the action is not quite as rapid as it was for product B.

It is desirable to have the specimen as strong as possible while still avoiding any tendency to crack the mold. This is accomplished with product C which is presently preferred. More particularly, the tensile modulus of product A prior to heating was 18,000 psi. Product B had a tensile modulus of only 8,000 psi. Product C had a tensile modulus of 12,000 psi. Since it is desired to provide adequate softening on heating with minimal loss of strength prior to heating, the semi-solids are preferred over the use of liquid thermoplastic materials.

The compositions shown in Table II are also preferred because they include both acrylate and methacrylate-functional materials which minimizes distortion in the stereolithographic process. Also, the viscosity of these compositions is low to ease the formation of thin layers and to facilitate draining unreacted liquid from the formed specimens. It is preferred to have present at least 5% of methacrylate-functional material and at least 40% of acrylate-functional material (which includes vinyl monomers have the same polymerization characteristics as previously noted.

What is claimed is:

1. A method of investment casting comprising the steps of:
   (a) investing a three-dimensional pattern in a mold material, said pattern being constituted by a cross-linked polymeric matrix constituted by light-cured ethylenically unsaturated material having dispersed therein a thermoplastic material having a melting temperature below about 100° C., and being non-reactive with said ethylenically unsaturated material;
   (b) and heating said mold material with said pattern within it to fuse the material of said mold and to burn said pattern out of said mold, said non-reactive material weakening said pattern during the heating operation to prevent the thermal expansion of said pattern from cracking said mold.

2. A method of investment casting as recited in claim 1 in which said pattern is invested in said mold material by applying an aqueous refractory slurry to said pattern, and drying said slurry to harden the same around said pattern.

3. A method of investment casting as recited in claim 1 in which said thermoplastic material is an oligomer having a melting point within the range of 10° C. to 40° C.

4. A method of investment casting as recited in claim 1 in which said thermoplastic material is an oligomer having a number average molecular weight in the range of about 200 to about 5000.

5. A method of investment casting as recited in claim 4 in which said oligomer has a number average molecular weight in the range of 250 to 1500.

6. A method of investment casting as recited in claim 4 in which said oligomer is soluble in said ethylenically unsaturated material.

7. A method of investment casting as recited in claim 4 in which said oligomer is present in an amount in the range of about 5 to about 50 weight percent based on the total weight of the composition.

8. A method of investment casting as recited in claim 7 in which said composition is substantially free of volatile organic solvent, and the viscosity of the composition is in the range of about 500 to about 2000 cp.

9. A method of investment casting as recited in claim 1 in which said ethylenically unsaturated liquid material is present in an amount of 65 to 85 weight percent based on the total weight of the composition.

10. A method of investment casting as recited in claim 1 in which said ethylenically unsaturated liquid material is constituted by a liquid mixture of from about 15 to about 80 weight percent of resinous poly(meth)acrylate and the balance thereof being ethylenically unsaturated liquid.

11. A method of investment casting as recited in claim 10 comprising a mixture of monoethylenically and polyethylenically unsaturated materials in a weight ratio of from 4:1 to 1:4.

12. A method of investment casting as recited in claim 11 in which said liquid mixture comprises at least 5% methacrylate-functional material and at least 40% of acrylate-functional material.

13. A method of investment casting as recited in claim 12 in which said liquid mixture includes from 10 to 40 weight percent of N-vinyl pyrrolidone based on the total weight of the composition, said N-vinyl pyrrolidone being considered to be acrylate-functional.

14. A method of investment casting comprising the steps of:
 (a) exposing a thin layer of light-curable, organic solvent-free, ethylenically unsaturated liquid to a light source to cause polymerization of selected portions of said thin layer, said ethylenically unsaturated liquid including from about 5% to about 40% of a thermoplastic material having a melting temperature below about 100° C., and being non-reactive with said ethylenically unsaturated material;
 (b) covering the said polymerized layer with a layer of said light-curable liquid composition;
 (c) exposing the uncured layer to the light source to polymerize selected portions of the uncured layer upon the previously set forth polymerized layer;
 (d) repeating steps (b) and (c) to produce a specimen;
 (e) completing the cure of said specimen to produce a pattern;
 (e) investing said pattern in a mold material and
 (f) heating the pattern and mold material to remove the pattern and fuse the mold material to produce a mold.

15. A method of investment casting as recited in claim 14 in which said light-curable liquid composition includes a photoinitiator for curing with light having a wavelength in the range of from 200 to about 600 nanometers.

16. A method of investment casting as recited in claim 14 in which said thermoplastic material is an oligomer having a melting point within the range of 10° C. to 40° C. and is soluble in said ethylenically unsaturated liquid.

17. A method of investment casting as recited in claim 16 in which the viscosity of the composition is in the range of about 500 to about 2000 centipoises and is a mixture of monoethylenically and polyethylenically unsaturated materials in a weight ratio of from 4:1 to 1:4.

18. A method of investment casting as recited in claim 17 in which said liquid mixture comprises at least 5% methacrylate-functional material and at least 40% of acrylate-functional material.

* * * * *

UNITED STATES PATENT AND TRADEMARK OFFICE
CERTIFICATE OF CORRECTION

PATENT NO. : 4,844,144

DATED : July 4, 1989

INVENTOR(S) : Edward J. Murphy, Robert E. Ansel and John J. Krajewski

It is certified that error appears in the above-identified patent and that said Letters Patent is hereby corrected as shown below:

Col. 5, line 1, "surround" should be ---surrounds---.
Col. 5, line 23, "removed" should be --- remove---.
Col. 6, line 5, "pentraerythritol" should be ---pentaerythritol---.
Col. 6, line 16, "Tome" should be ---Tone---.
Col. 6, lines 27 and 28, "(meth-)acrylate" should be --- (meth)-acrylate---.
Col. 7, lines 13 and 14, "di(-meth)acrylate" should be ---di-(meth)acrylate---.
Col. 7, lines 60 and 61, "polye-thylenically" should be ---poly-ethylenically---.

Signed and Sealed this

Twenty-fourth Day of July, 1990

Attest:

HARRY F. MANBECK, JR.

Attesting Officer

Commissioner of Patents and Trademarks